US012675934B2

(12) United States Patent
Inayoshi et al.

(10) Patent No.: US 12,675,934 B2
(45) Date of Patent: Jul. 7, 2026

(54) AVATAR GENERATION SYSTEM, AVATAR GENERATION METHOD, AND RECORDING MEDIUM

(71) Applicant: NEC Corporation, Tokyo (JP)

(72) Inventors: Kiri Inayoshi, Tokyo (JP); Kentaro Nishida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 195 days.

(21) Appl. No.: 18/400,037

(22) Filed: Dec. 29, 2023

(65) Prior Publication Data

US 2024/0242415 A1     Jul. 18, 2024

(30) Foreign Application Priority Data

Jan. 13, 2023     (JP) ................................. 2023-003523

(51) Int. Cl.
*G06T 13/80*          (2011.01)
*G06T 7/246*          (2017.01)
*G06T 11/00*          (2026.01)
*G06T 13/40*          (2011.01)

(52) U.S. Cl.
CPC .............. *G06T 13/80* (2013.01); *G06T 7/251* (2017.01); *G06T 11/00* (2013.01); *G06T 13/40* (2013.01); *G06T 2207/30196* (2013.01); *G06T 2210/16* (2013.01); *G06T 2210/21* (2013.01)

(58) Field of Classification Search
CPC ......... G06T 13/80; G06T 7/251; G06T 11/00; G06T 13/40; G06T 2207/30196; G06T 2210/16; G06T 2210/21; G06T 19/00
See application file for complete search history.

(56) References Cited

U.S. PATENT DOCUMENTS

| 2016/0163103 A1* | 6/2016 | DeTemmerman .... G06T 17/205 |
| | | 345/419 |
| 2019/0244407 A1* | 8/2019 | Wiesel ................. G06V 10/255 |
| 2019/0287301 A1* | 9/2019 | Colbert .................. G06N 3/084 |
| 2021/0118239 A1* | 4/2021 | Santesteban ........... G06N 3/044 |
| 2024/0221318 A1* | 7/2024 | Barzelay ................ G06T 15/06 |

FOREIGN PATENT DOCUMENTS

| JP | 2002117414 A | * | 4/2002 |
| JP | 2016-110652 A | | 6/2016 |

OTHER PUBLICATIONS

Maya Help Autodesk, "Keyframe Animation and nCloth Collision attributes" (Year: 2022).*
Imao, machine translation of JP-2002117414-A (Year: 2002).*

* cited by examiner

*Primary Examiner* — Kee M Tung
*Assistant Examiner* — Xiaoming Wei
(74) *Attorney, Agent, or Firm* — Sughrue Mion, PLLC

(57) ABSTRACT

An avatar generation system includes an acquisition unit, an execution unit, a detection unit, and an output unit. The acquisition unit acquires setting data for bones and meshes of an avatar. The execution unit executes processing of changing a posture of the avatar based on the setting data and a defined movement. The detection unit detects a state of penetration between the meshes constituting the avatar based on data in which the posture of the avatar has been changed. The output unit outputs a result of the detection.

18 Claims, 8 Drawing Sheets

AVATAR MANAGEMENT SYSTEM

10

AVATAR GENERATION SYSTEM

40

VIRTUAL SPACE MANAGEMENT SYSTEM

30

TERMINAL DEVICE

Fig.2
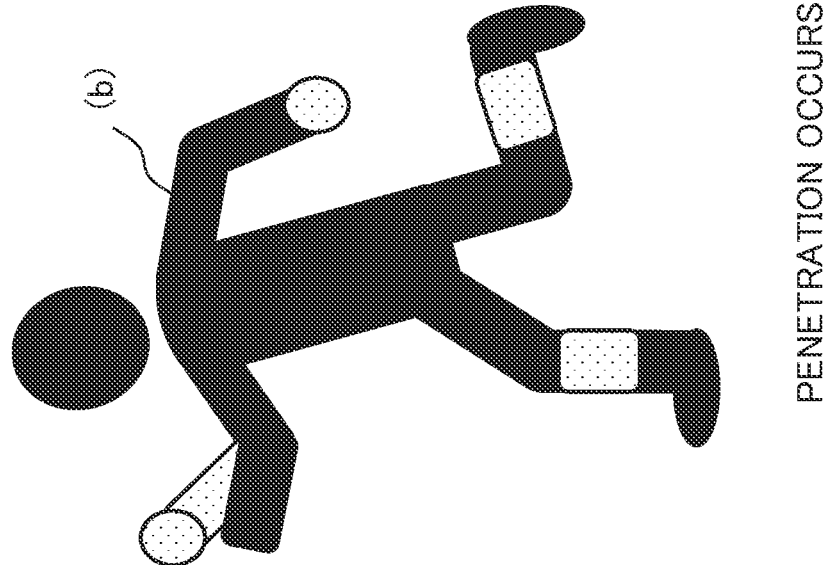
(b)
PENETRATION OCCURS
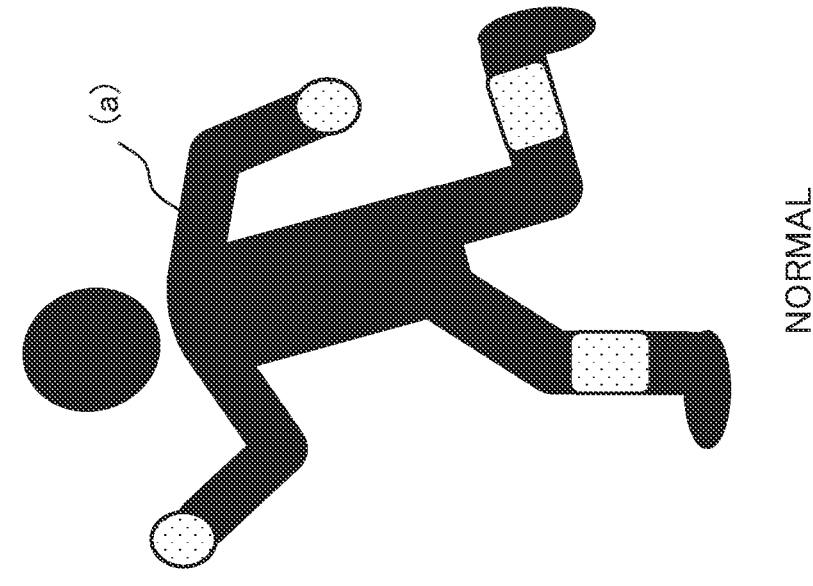
(a)
NORMAL

Fig.3
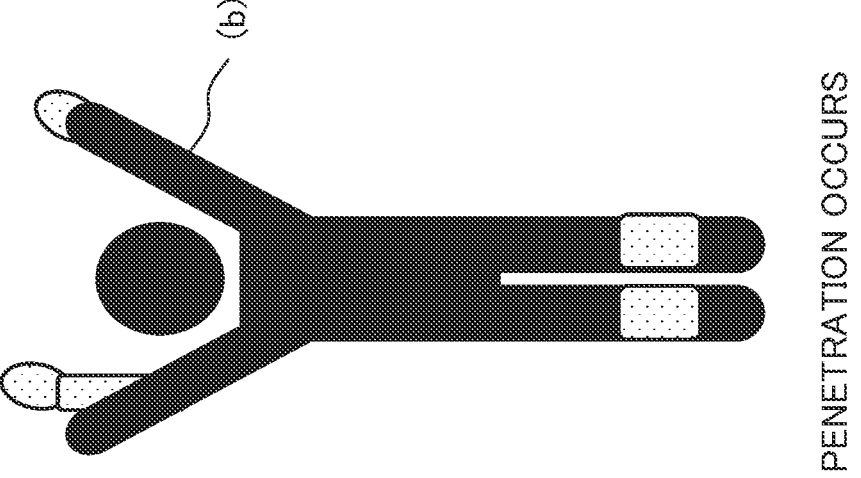
(b)
PENETRATION OCCURS
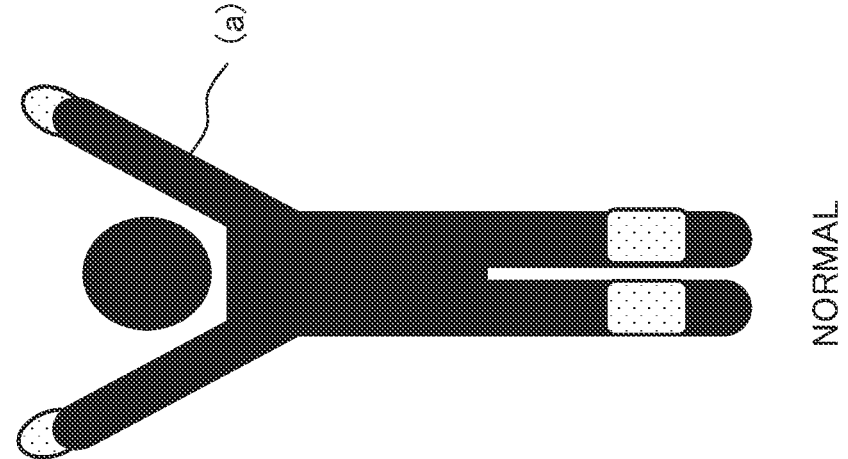
(a)
NORMAL

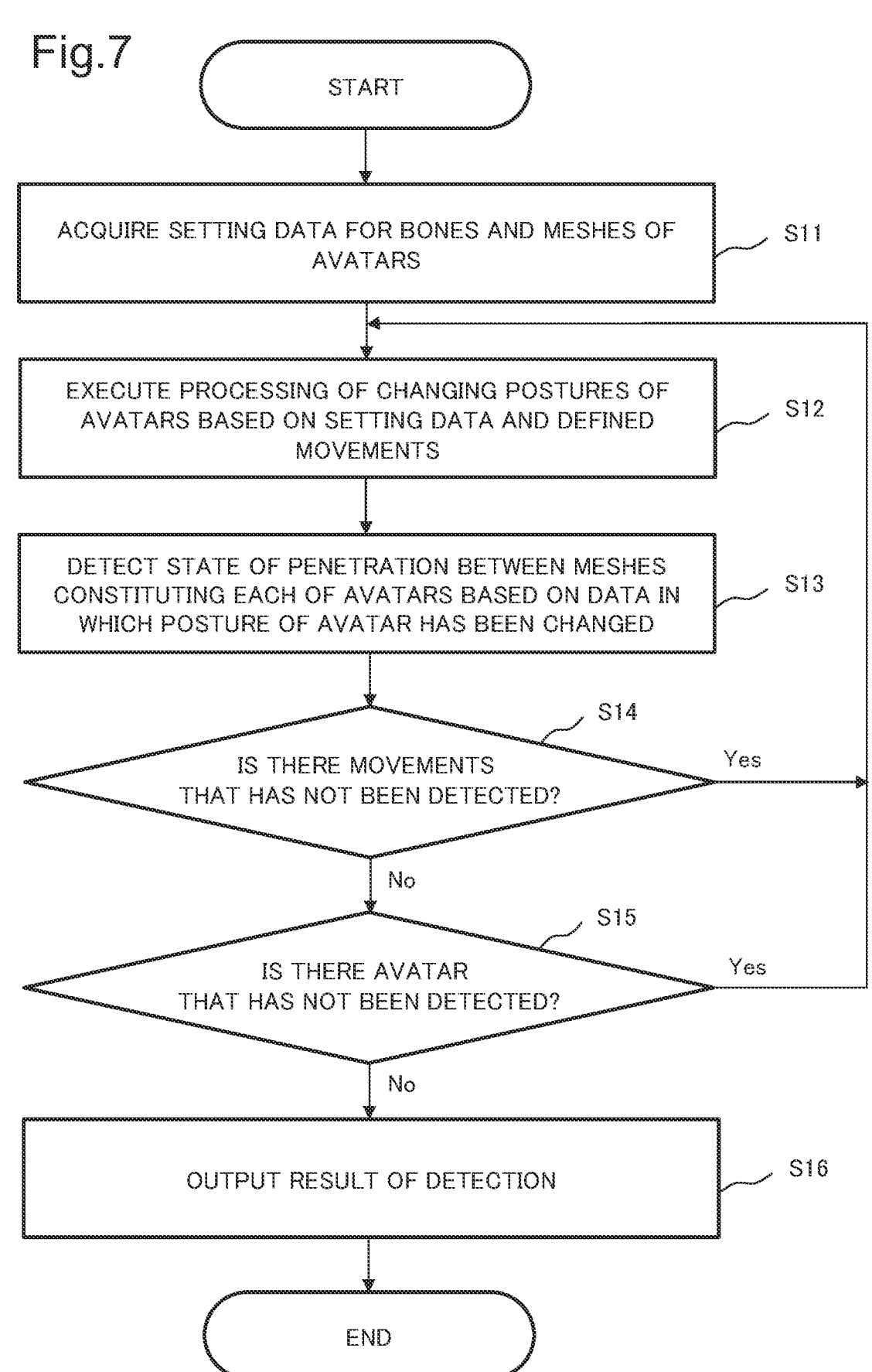

START

ACQUIRE SETTING DATA FOR BONES AND MESHES OF AVATARS — S11

EXECUTE PROCESSING OF CHANGING POSTURES OF AVATARS BASED ON SETTING DATA AND DEFINED MOVEMENTS — S12

DETECT STATE OF PENETRATION BETWEEN MESHES CONSTITUTING EACH OF AVATARS BASED ON DATA IN WHICH POSTURE OF AVATAR HAS BEEN CHANGED — S13

IS THERE MOVEMENTS THAT HAS NOT BEEN DETECTED? — S14

Yes

No

IS THERE AVATAR THAT HAS NOT BEEN DETECTED? — S15

Yes

No

OUTPUT RESULT OF DETECTION — S16

END

AVATAR GENERATION SYSTEM, AVATAR GENERATION METHOD, AND RECORDING MEDIUM

This application is based upon and claims the benefit of priority from Japanese Patent Application No. 2023-3523, filed on Jan. 13, 2023, the disclosure of which is incorporated herein in its entirety by reference.

TECHNICAL FIELD

The present disclosure relates to an avatar generation system and the like.

BACKGROUND ART

An avatar creator generates an avatar by combining a bone and a mesh for each piece of clothing or the like worn by the avatar with an avatar's body. For example, in an implementation method for designing an avatar according to PTL 1 (JP 2016-110652 A), a misalignment between the skin and the clothing of the avatar is detected, and a vertex indicating a side of the clothing is displaced when the misalignment is detected.

SUMMARY

An object of the present disclosure is to provide an avatar generation system and the like capable of easily detecting penetration between meshes that can be caused by a movement of an avatar.

An avatar generation system according to an aspect of the present disclosure includes an acquisition unit that acquires setting data for bones and meshes of an avatar, an execution unit that executes processing of changing a posture of the avatar based on the setting data and a defined movement, a detection unit that detects a state of penetration between the meshes constituting the avatar based on data in which the posture of the avatar has been changed, and an output unit that outputs a result of the detection.

An avatar generation method according to an aspect of the present disclosure includes acquiring setting data for bones and meshes of an avatar, executing processing of changing a posture of the avatar based on the setting data and a defined movement, detecting a state of penetration between the meshes constituting the avatar based on data in which the posture of the avatar has been changed, and outputting a result of the detection.

A non-transitory recording medium according to an aspect of the present disclosure non-transitorily records an avatar generation program for causing a computer to execute acquiring setting data for bones and meshes of an avatar, executing processing of changing a posture of the avatar based on the setting data and a defined movement, detecting a state of penetration between the meshes constituting the avatar based on data in which the posture of the avatar has been changed, and outputting a result of the detection.

BRIEF DESCRIPTION OF THE DRAWINGS

Exemplary features and advantages of the present disclosure will become apparent from the following detailed description when taken with the accompanying drawings in which:

FIG. 1 is a diagram illustrating an outline of a virtual space system according to an example embodiment of the present disclosure;

FIG. 2 is a diagram schematically illustrating an example of a display screen according to an example embodiment of the present disclosure;

FIG. 3 is a diagram schematically illustrating an example of a display screen according to an example embodiment of the present disclosure;

FIG. 4 is a diagram illustrating an example of a configuration of an avatar generation system according to an example embodiment of the present disclosure;

FIG. 7 is a diagram illustrating an example of an operation flow of an avatar generation system according to an example embodiment of the present disclosure.

EXAMPLE EMBODIMENT

Figure 1:
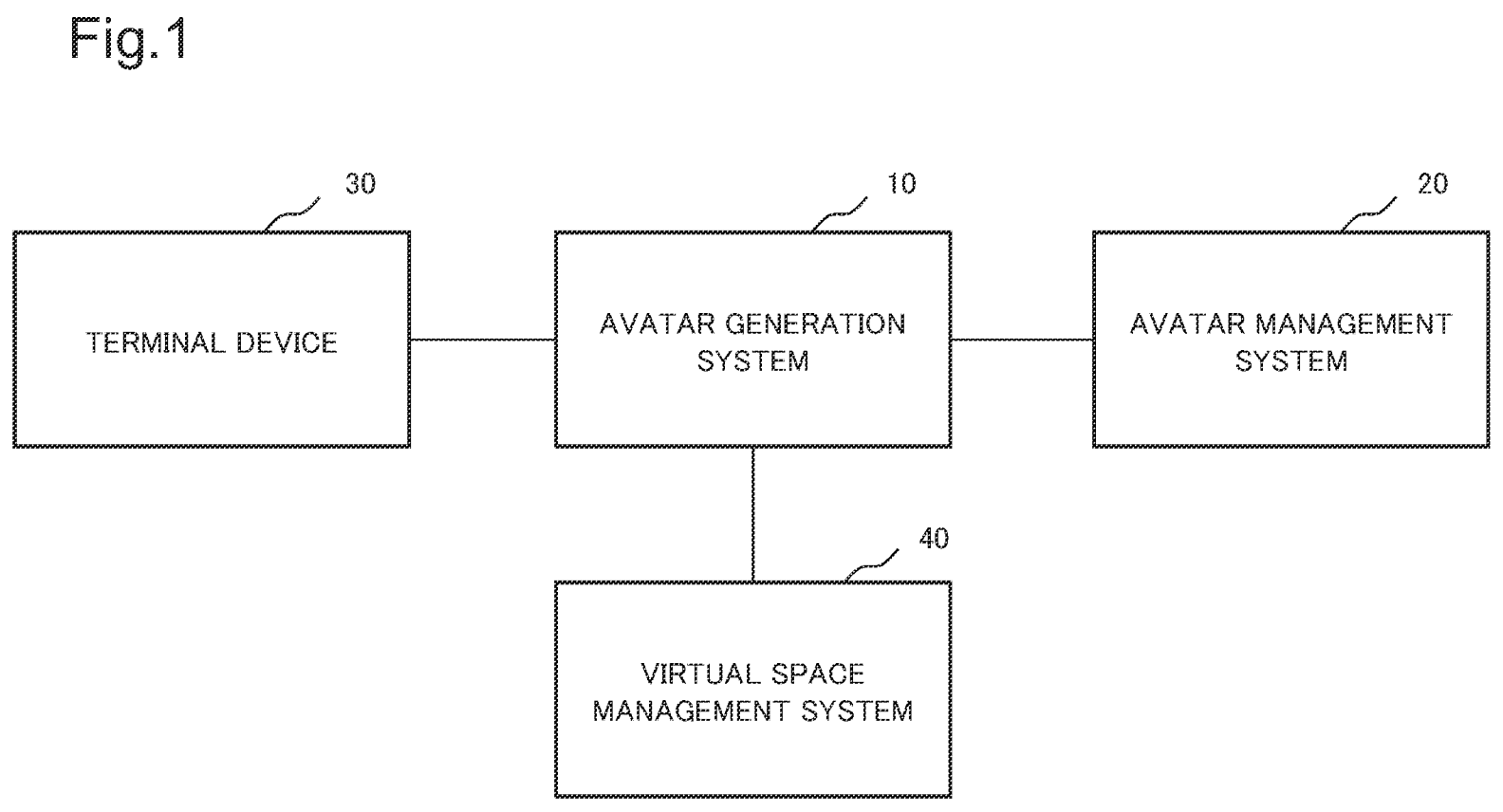
Figure 5:
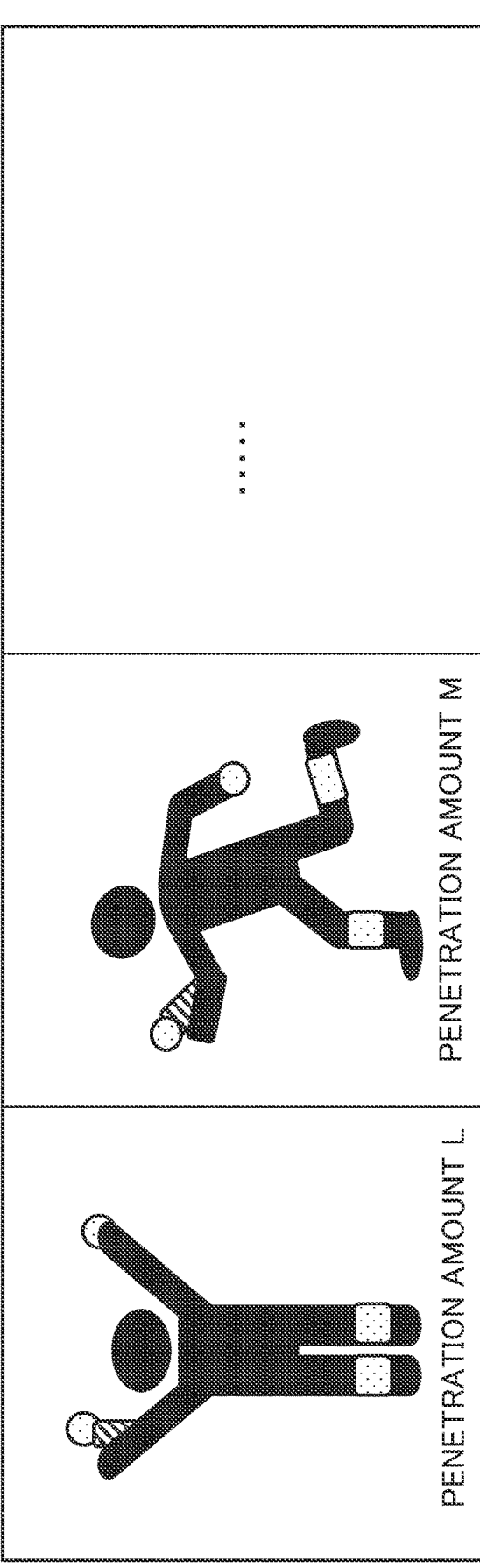
FIG. 5 is a diagram illustrating an example of a display screen according to an example embodiment of the present disclosure.

Example embodiments of the present disclosure will be described in detail with reference to the drawings. FIG. 1 is a diagram illustrating an outline of a configuration of a virtual space system according to the present disclosure. The virtual space system includes, for example, an avatar generation system 10, an avatar management system 20, a terminal device 30, and a virtual space management system 40. The avatar generation system 10 is connected to the avatar management system 20, for example, via a network. Furthermore, the avatar generation system 10 is connected to the terminal device 30, for example, via a network. In addition, the avatar management system 20 is connected to the virtual space management system 40 via, for example, a network. The number of avatar management systems 20, the number of terminal devices 30, and the number of virtual space management systems 40 can be appropriately set.

The virtual space system is, for example, a system that creates an avatar used in a virtual space and manages data for the avatar. The avatar used in the virtual space is used, for a user of the virtual space to act in the virtual space by operating the avatar. That is, the avatar is a subject that acts in the virtual space instead of the user operating the avatar. The virtual space in which the user participates by operating the avatar present in the virtual space is also referred to as a meta-verse space. The avatar may be an avatar used in a web, a social networking service (SNS), or a game. The environment in which the avatar is used is not limited to what has been described above.

The avatar generation system 10 is, for example, a system that adjusts a setting value of setting data for an avatar used in the virtual space. Furthermore, the avatar management system 20 is, for example, a system that manages data related to an avatar. The data related to the avatar is, for example, setting data for the avatar. The setting data for the avatar is, for example, setting data for a structure of the avatar and data related to a movement of the avatar. The terminal device 30 is, for example, a terminal device used by an avatar creator to access the avatar generation system 10 and adjust a setting value for the avatar. Furthermore, the virtual space management system 40 is, for example, a system that manages the virtual space. The virtual space management system 40 manages, for example, the display of the virtual space and the display of the avatar in the virtual space. The avatar for which the setting value of the setting data has been adjusted by the avatar generation system 10 is managed, for example, by the avatar management system 20. The avatar for which the setting data is managed by the avatar management system 20 is used by, for example, the virtual space management system 40.

The avatar is constituted by, for example, an avatar body and a bone and a mesh for each of avatar attachments. The avatar creator generates the avatar by, for example, combining the bone and the mesh for each of the avatar attachments with the avatar body. The bone is, for example, a skeleton portion of the avatar. The bone determines, for example, a skeletal portion in a movement of the avatar. That is, the bone is a skeleton portion that gives a change in shape of the avatar. The skeleton portion of the avatar includes, for example, a plurality of bones and joints between the bones. The movement of the avatar's body is expressed, for example, by changing a positional relationship between the bones at both ends with the joint as an axis.

The mesh is used, for example, to express the shape of the avatar. Furthermore, one avatar includes, for example, a plurality of meshes. The plurality of meshes correspond to, for example, respective portions of the avatar's body. Furthermore, the plurality of meshes corresponds to, for example, respective pieces of clothing worn by the avatar. The meshes are, for example, parts for expressing the skin of the avatar and the clothing worn by the avatar. The clothing includes shoes, hats, and accessories. The meshes are not limited to the above-described examples. Furthermore, a color and a pattern of the surface of the avatar are expressed by assigning image data. The image data for expressing the color and pattern of the surface of the avatar is also referred to as texture. For example, a color of the skin of the avatar and a color of the clothing are expressed using texture.

Furthermore, a plurality of meshes arranged at the same portion of the avatar's body are arranged, for example, in an overlapping manner. The avatar is created in such a way that only the foremost one of the plurality of meshes arranged at the same portion of the avatar's body can be visually recognized. For example, in a case where a clothing mesh overlaps a front surface of a skin mesh, the user of the virtual space can visually recognize only the clothing. By making it possible to visually recognize only the foremost mesh among the plurality of meshes arranged at the same portion of the avatar's body, the avatar looks natural, for example, as a person. Furthermore, meshes for a plurality of pieces of clothing may overlap each other. The shapes of the meshes are expressed by a polygon obtained by connecting vertices in the respective meshes. Each of the vertices of the meshes is weighted and associated with a bone. The weighting used when each of the vertices of the meshes is associated with a bone is also referred to as a weight. Each of the vertices of the meshes moves in conjunction with the movement of the bone, for example, when the bone moves. Since the bone moves in conjunction with a plurality of meshes, the user can recognize that one avatar is moving, for example, by viewing the movement of the plurality of meshes.

However, when the avatar moves, if a misalignment occurs between the meshes overlapping each other, the avatar may look unnatural. The occurrence of the misalignment between the meshes is also referred to as penetration between the meshes. For example, in a case where the avatar includes a skin mesh and a clothing mesh, a misalignment may occur between the skin mesh and the clothing mesh, and a portion of the skin that should be hidden by the clothing may be seen. When the portion of the skin that should not be seen is seen, the avatar may look unnatural.

Penetration between the meshes occurs, for example, because the optimal value of the weight of the mesh with respect to the bone differs for each mesh. The weight of the mesh is, for example, an index indicating how much the position of the vertex of the mesh follows the change in position of the bone. That is, the weight is an amount by which the mesh follows the bone. In a case where the optimal value of the weight of the mesh with respect to the bone differs for each mesh, when the avatar moves, penetration between the meshes that normally overlap each other may occur. Therefore, it is necessary to adjust the weight of the mesh with respect to the bone, for example, for the portion where the penetration between the meshes has occurred.

For example, the avatar creator adjusts the setting value for the avatar to prevent an occurrence of penetration between meshes even when the avatar makes various movements. The setting value for the avatar adjusted in this case is, for example, the weight of the mesh with respect to the bone. The avatar creator adjusts the setting value for the avatar, for example, to prevent an occurrence of penetration between meshes during a movement of the avatar assumed to be performed in the virtual space. In order to adjust the setting value for the avatar to prevent an occurrence of penetration between meshes, the avatar creator needs to grasp, for example, at which portion of the avatar and at what timing the penetration between the meshes occurs when the avatar is moved. Furthermore, in order to adjust the setting value for the avatar, the avatar creator needs to grasp, for example, an amount of the penetration between the meshes when the penetration between the meshes occurs.

The amount of the penetration between the meshes is, for example, an amount of a misalignment between the meshes. The avatar generation system 10 is, for example, a system that detects a portion where penetration between meshes occurs, an amount of the penetration between meshes, and a timing at which the penetration between meshes occurs, in order to adjust a setting value for an avatar where the penetration between meshes occurs.

FIGS. 2 and 3 are examples in each of which an image of a normal avatar in which penetration has not occurred when the avatar has moved is compared with an image of an avatar in which penetration has occurred when the avatar has moved. In the examples of images of avatars in each of FIGS. 2 and 3, the image of the avatar (a) on the left side is an image of a normal avatar in which no penetration has occurred. In addition, in the examples of images of avatars in each of FIGS. 2 and 3, the image of the avatar (b) on the right side is an image of an avatar in which penetration has occurred between meshes. In the examples of images of avatars of FIGS. 2 and 3, portions hatched by dots indicate portions where the skin is visible. However, in each of the examples of images of avatars of FIGS. 2 and 3, a face and a head are shown in black. In addition, in each of the examples of images of avatars of FIGS. 2 and 3, black portions indicate clothing.

In the examples of images of avatars in FIG. 2, the avatars are running. In the image of avatar (a) in FIG. 2, the skin is visible only in the hand portions on the upper body. On the other hand, in the image of avatar (b) in FIG. 2, the skin is visible in a partial portion of one arm as well as the hand portions. That is, in the image of avatar (b) in FIG. 2, penetration has occurred between a skin mesh and a clothing mesh.

In the examples of images of avatars in FIG. 3, the avatars are stretching themselves. In the image of avatar (a) in FIG. 3, the skin is visible only in the hand portions on the upper body. On the other hand, in the image of avatar (b) in FIG. 3, the skin is visible in a partial portion of one arm as well as the hand portions. That is, in the image of avatar (b) in FIG. 3, penetration has occurred between a skin mesh and a clothing mesh. The avatar generation system 10 detects, for example, a portion where penetration occurs as in avatar (b) of FIG. 2 and avatar (b) of FIG. 3, an amount of the penetration, and a timing at which the penetration occurs.

The avatar generation system 10 executes processing of changing a posture of the avatar based on a defined movement. Then, the avatar generation system 10 detects a state of penetration between meshes. The state of penetration is, for example, information indicating how the meshes penetrate through each other. The state of penetration refers to, for example, a portion where the penetration has occurred and an amount of the penetration. The state of penetration may include a timing at which the penetration has occurred. The state of penetration is not limited to what has been described above.

The defined movement is, for example, a movement assumed according to a purpose of the avatar. The defined movement is a validation pattern that defines how to change the posture of the avatar as a sequence of movements in order to detect penetration between meshes of the avatar. For example, when the avatar performs a kicking motion, the defined movement defines postures of the avatar from the beginning of the kicking motion to the end of the kicking motion. The defined movement includes, for example, the type of movement of the avatar and the posture of the avatar. The type of movement of the avatar is, for example, a walking state, a running state, or a jumping state. The state of the movement of the avatar is not limited to what has been described above. The posture of the avatar is, for example, a posture of the avatar when the avatar moves. For example, in a case where the avatar is an avatar playing a ball game, the defined movement is a posture in each movement of the avatar that can be assumed in the ball game. The movement of the avatar that can be assumed in the ball game is a posture of the avatar in each of a running movement, a jumping movement, an opponent avoiding movement, a crouching movement, a ball catching movement, and a ball throwing movement. Furthermore, in a case where the avatar is an avatar performing martial arts, the defined movement is a posture in each movement of the avatar that can be assumed in the martial arts. The movement of the avatar that can be assumed in the martial arts is a posture of the avatar in each of an opponent lifting movement, an opponent thrusting movement, an opponent kicking movement, an opponent dodging movement, a jumping movement, and a crouch movement. In a case where the avatar is used for confirmation when trying on clothing, the defined movement is a posture in a movement of the avatar that can be assumed in the try-on of the clothing. The movement of the avatar that can be assumed in the try-on of the clothing is, for example, a posture of the avatar in each of a reaching-out movement, an arm bending movement, a sitting movement, a standing movement, a foot raising movement, a bending-forward movement, and a looking-back movement. The defined movement is not limited to what has been described above. The portion where the penetration has occurred, the amount of the penetration, and the timing at which the penetration has occurred, which are detected by the avatar generation system 10, are used, for example, to correct the setting value for the avatar.

Figure 4:
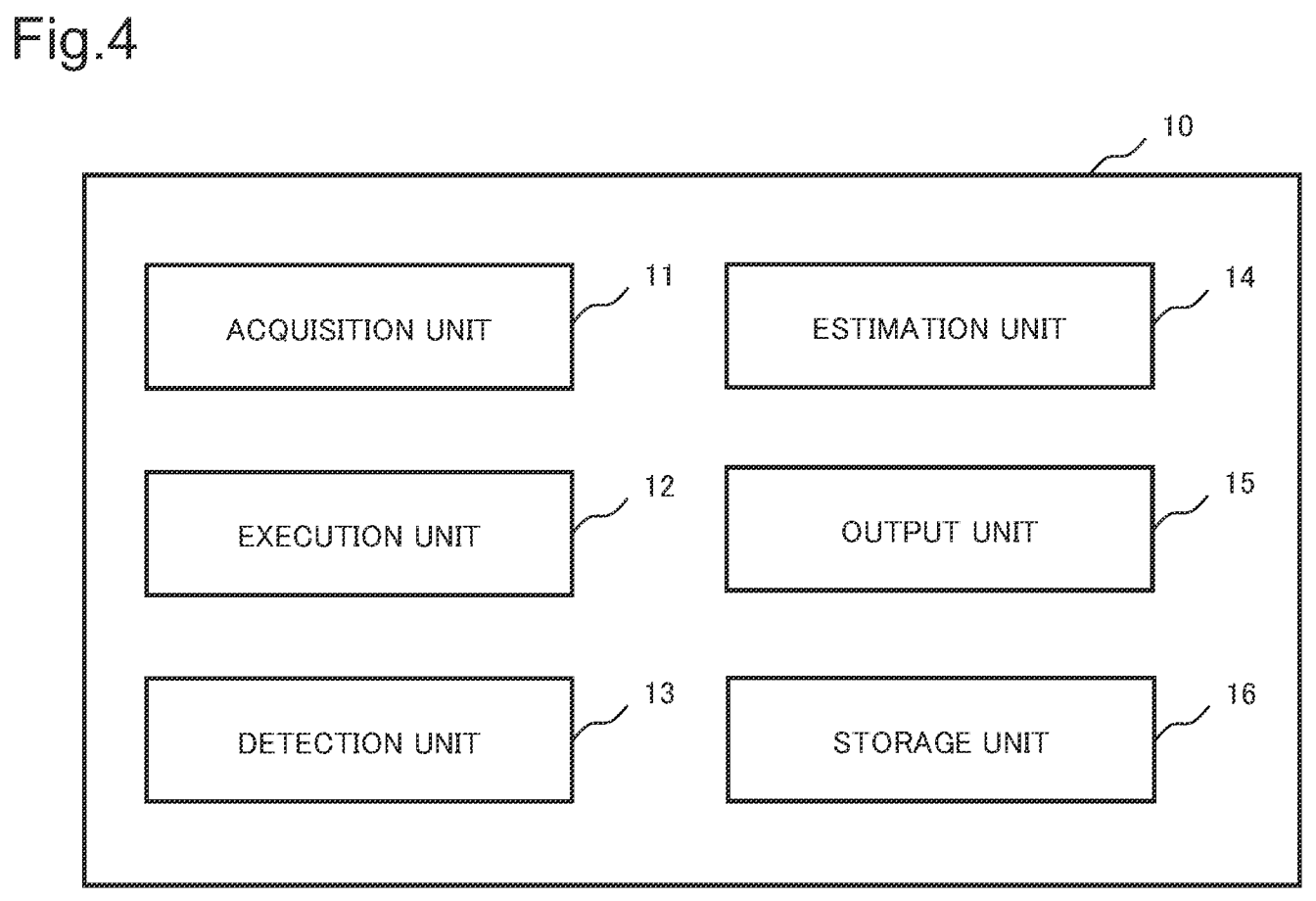

Here, an example of a specific configuration of the avatar generation system 10 will be described. FIG. 4 is a diagram illustrating an example of a configuration of the avatar generation system 10. The avatar generation system 10 includes, as a basic configuration, an acquisition unit 11, an execution unit 12, a detection unit 13, and an output unit 15. The avatar generation system 10 further includes, for example, an estimation unit 14 and a storage unit 16.

The acquisition unit 11 acquires setting data for the bones and the meshes of the avatar. The setting data for the bones and the meshes of the avatar includes, for example, setting data related to structures of the bones and the meshes of the avatar, and setting data related to the movement of the avatar. The acquisition unit 11 acquires setting data for the avatar, for example, from the avatar management system 20. The setting data regarding the structures of the bones and the meshes of the avatar is, for example, setting data regarding a structure of each of the bones and the meshes. Among the setting data regarding the structures of the bones and the meshes of the avatar, setting data for the bones is, for example, data indicating positions of the bones, lengths of the bones, and joints between the bones. Furthermore, among the setting data regarding the structures of the bones and the meshes of the avatar, setting data for the meshes is, for example, data indicating shapes of the meshes and positions of the vertices of the meshes. The setting data related to the movement of the avatar is, for example, setting data indicating how to move the bones for each pattern of movement of the avatar and setting data indicating weights of the meshes with respect to the bones. Furthermore, in a case where penetration is detected between meshes in each of a plurality of avatars, the acquisition unit 11 may acquire setting data for bones and meshes of a plurality of avatars to be detected.

The acquisition unit 11 may acquire a defined movement to be used at the time of detecting penetration between meshes. For example, the acquisition unit 11 acquires, from the terminal device 30, a defined movement used at the time of detecting penetration between meshes. Furthermore, the acquisition unit 11 may acquire information indicating what type of movement is to be used at the time of changing the posture of the avatar among a plurality of types of movements included in the defined movement. The acquisition unit 11 acquires, for example, information indicating what type of movement is to be used from the terminal device 30. The defined movement or the information indicating what type of movement is to be used is input by the avatar creator to the terminal device 30, for example.

The acquisition unit 11 may acquire a defined movement set for each purpose of the avatar. Furthermore, in a case where the defined movement is set for each purpose of the avatar, the acquisition unit 11 may acquire a selection of a purpose of the avatar. The selection of the purpose of the avatar is input to, for example, the terminal device 30 by the avatar creator. The acquisition unit 11 acquires, for example, the defined movement set for each purpose of the avatar or the selection of the purpose of the avatar from the terminal device 30. The defined movement set for each purpose of the avatar is, for example, a movement that is assumed to be frequently performed according to the purpose of the avatar. The purpose of the avatar is, for example, how the user of the virtual space uses the avatar. For movements that are rarely performed depending on the purpose of the avatar, penetration between meshes may be allowed. For example, in a case where the main purpose of the avatar is interacting with other users in the virtual space via the avatar, penetration between meshes of the avatar in a strenuous movement, such as in sports, may be allowed.

The purpose of the avatar is set as, for example, use for a normal action such as walking around in the virtual space and conversation in the virtual space, use for playing sport in the virtual space, and use for participating in an attraction in the virtual space. The use for playing sport may be sorted into a more detailed use depending on the content of sport. For example, the use related to sport may be sorted into a ball game, swimming, or athletics. Furthermore, the ball game may be more specifically sorted into baseball, soccer, basketball, or rugby. Furthermore, the uses for participating in an attraction in the virtual space may be sorted into a more specific use. The purpose of the avatar is not limited to the above-described examples. Furthermore, in a case where the defined movement is set for each purpose of the avatar, the acquisition unit 11 may acquire a selection of a purpose of the avatar from, for example, the terminal device 30. The selection of the purpose of the avatar is input to, for example, the terminal device 30 by an operation of the avatar creator.

The execution unit 12 executes processing of changing a posture of the avatar based on the setting data for the bones and the meshes of the avatar and the defined movement. For example, the execution unit 12 changes the posture of the avatar by operating a movement of the avatar according to the defined movement using the setting data for the bones and the meshes. Then, the execution unit 12 generates, for example, data for the avatar in which the posture of the avatar has been changed. The data in which the posture of the avatar has been changed is, for example, an image of the avatar when the processing of changing the posture of the avatar has been executed. The data in which the posture of the avatar has been changed may be coordinate data for the bones and the meshes when the processing of changing the posture of the avatar has been executed. Furthermore, in a case where there are a plurality of target avatars in which penetration between meshes is to be detected, the execution unit 12 executes processing of changing a posture of an avatar based on a defined movement for each avatar.

In a case where a defined movement is set for each purpose of the avatar, the execution unit 12 executes processing of changing a posture of the avatar according to the defined movement based on the purpose of the avatar, for example, using setting data for bones and meshes. By changing the posture of the avatar according to the defined movement based on the purpose of the avatar, for example, data in which the posture of the avatar has been changed according to the purpose of the avatar is generated. The data when the avatar has moved is, for example, an image indicating the movement of the avatar. In a case where the defined movement according to the purpose of the avatar is a movement related to a ball game, the execution unit 12 changes the posture of the avatar for the avatar to perform a movement related to a ball game. By changing the posture of the avatar to perform a movement related to a ball game, an image of the avatar when the avatar is performing a movement related to a ball game is generated.

The detection unit 13 detects a state of penetration between meshes constituting the avatar based on data in which the posture of the avatar has been changed. The detection unit 13 detects the state of penetration between the meshes constituting the avatar based on the movement of the avatar operated according to the defined movement, for example, using a detection model. The state of penetration is, for example, a portion of the penetration between the meshes and an amount of the penetration. The detection model may further detect a timing at which the penetration occurs.

The detection model detects the penetration between meshes constituting the avatar, for example, based on an image in which the posture of the avatar has been changed. The detection model detects a state of penetration between the meshes, for example, based on an image in which the posture of the avatar has been changed according to the defined movement. The detection model detects, for example, a state in which a mesh that should not be visible because it is hidden by the front mesh is visible in the image in which the posture of the avatar has been changed. For example, in a case where the penetration between meshes is penetration between a skin mesh and a clothing mesh, the detection model detects a portion where the skin is visible at a position on the body where the skin should not be visible because the skin overlaps clothing that should be displayed on the front according to the setting of the avatar based on the image in which the posture of the avatar has been changed according to the defined movement. The detection model outputs a state of penetration between meshes, with an image showing the posture of the avatar that has been changed based on the defined movement as an input. The detection model may detect penetration between meshes that do not include the skin.

The detection unit 13 detects a portion where the skin is visible due to the penetration and a timing at which the skin is visible due to the occurrence of the penetration, for example, using the detection model. For example, the detection unit 13 detects an image in which penetration between meshes is detected by the detection model as an image at a timing when the penetration occurs between the meshes. Then, the detection unit 13 detects an amount of the penetration from data regarding the movement of the avatar. The amount of the penetration is, for example, an amount of a misalignment between the meshes where the penetration has occurred. The detection unit 13 calculates the amount of the penetration between the meshes, for example, using a distance between vertices set in respective outer peripheral portions of the meshes.

The detection model may detect a state of penetration between the meshes based on coordinate data for the bones and the meshes when the posture of the avatar has been changed. For example, the detection model outputs a portion of the penetration between meshes and an amount of the penetration, with the coordinate data for the bones and the meshes when the posture of the avatar has been changed as an input. Furthermore, the detection model may also detect a timing at which the penetration occurs between the meshes based on the coordinate data for the bones and the meshes when the posture of the avatar has been changed.

The detection model is an image recognition model generated by deep learning using a neural network. The detection model is generated, for example, by learning a relationship between an image showing an avatar whose posture has been changed, whether penetration has occurred, and a portion of the penetration. The detection model may be generated by learning a relationship between an image showing the avatar whose posture has been changed, whether penetration has occurred, a portion of the penetration, and an amount of the penetration. The detection model may be generated, for example, by learning a relationship between coordinate data for bones and meshes of the avatar whose posture has been changed, whether penetration has occurred, and a portion of the penetration. The detection model may be generated by learning a relationship between coordinate data for bones and meshes of the avatar whose posture has been changed, whether penetration has occurred, a portion of the penetration, and an amount of the penetration. The detection model is generated, for example, by a system outside the avatar generation system 10.

The detection unit 13 may detect a state of penetration between the meshes based on coordinate data for the bones and the meshes when the posture of the avatar has been changed. For example, the detection unit 13 compares a distance between vertices set in respective outer peripheral portions of the meshes, using coordinate data for the meshes when the posture of the avatar has been changed based on the defined movement. Then, when the distance between the vertices is equal to or more than a reference, the detection unit 13 detects that penetration has occurred between the meshes. The detection unit 13 detects a portion including the vertices between which the penetration has been detected as the portion where the penetration has occurred. In addition, the detection unit 13 detects an amount of the penetration based on the distance between the vertices. In addition, a timing at which data indicating that the penetration has occurred is acquired is detected as the timing at which the penetration has occurred. Furthermore, in a case where there are a plurality of target avatars in which penetration between meshes is to be detected, the detection unit 13 detects penetration between meshes constituting an avatar based on coordinate data for bones and meshes when the posture of the avatar has been changed for each avatar.

For example, the estimation unit 14 estimates correction amounts of setting values related to the meshes based on a detection result. The estimation unit 14 estimates the correction amounts of the setting values in the setting data for the meshes, for example, based on the detected amount of the penetration for the portion where the penetration has been detected. For example, the estimation unit 14 estimates correction values of weights of the meshes based on the detected amount of the penetration for the portion where the penetration has been detected. The weights of the meshes are, for example, amounts by which the meshes follows the bone when the positions of the meshes are changed with respect to a change in position of the bone. A relationship between the amount of the penetration and the correction amount is set, for example, using a function indicating the relationship between the amount of the penetration and the correction amount. The relationship between the amount of the penetration and the correction amount may be set using a data table indicating the relationship between the amount of the penetration and the correction amount. The correction values of the weights of the meshes are set to reduce the amount of the penetration between the meshes where penetration has occurred. The correction value may be a value of a weight after correction, or may be a value indicating a difference between a weight before correction and a weight after correction. For example, the estimation unit 14 estimates a correction value of a weight of each of the meshes between which the penetration has been detected. Furthermore, in a case where there are a plurality of target avatars in which penetration between meshes is to be detected, the estimation unit 14 estimates a correction amount of a setting value related to a mesh for each of the avatars.

For example, when penetration has occurred between a reference mesh and another mesh, the estimation unit 14 may estimate a correction amount of a setting value only for the mesh other than the reference mesh. For example, when the posture of the avatar has been changed, the skin mesh is set as a reference mesh, assuming that the skin mesh follows the bone. In a case where the skin mesh is a reference mesh, when penetration has occurred between the skin mesh and the clothing mesh, the estimation unit 14 estimates a correction value of a weight of a mesh with respect to the bone only for the clothing mesh. In addition, a weight value related to the correction of the setting value may be set for each mesh. The weight value is set, for example, such that a mesh that is corrected in a greater range, among the meshes between which the penetration has occurred, is given a larger weight value. The estimation unit 14 estimates a correction value of the weight of the mesh with respect to the bone based on the weight value. Furthermore, in a case where penetration has been detected at a plurality of timings, the estimation unit 14 may estimate a statistical value of correction values estimated at the timings, respectively, as a correction value of a target portion. In addition, the setting value of the mesh to be corrected may be other than the weight of the mesh. The setting value of the mesh to be corrected may be at least one of a shape of the mesh and a position of a vertex of the mesh. The setting value of the mesh to be corrected may include at least one of a shape of the mesh and a position of a vertex of the mesh in addition to the weight of the mesh. The setting value of the mesh to be corrected is not limited to what has been described above.

The estimation unit 14 may estimate a correction amount of a setting value of each of the plurality of meshes based on priorities set for at least some of the plurality of meshes. For example, the estimation unit 14 estimates a correction amount of each of the plurality of meshes based on the priorities set for at least some of the plurality of meshes. The priorities are set, for example, in such a way that a mesh that is not desired to be changed has a higher priority. For example, in a case where penetration between two meshes is corrected, the estimation unit 14 corrects a setting value of a mesh having a lower priority. In a case where penetration between two meshes is corrected, the estimation unit 14 may correct a setting value of each of the meshes at a ratio based on the priorities. In a case where penetration between two meshes is corrected, the estimation unit 14 corrects a setting value, for example, in such a way that a correction amount of a mesh having a higher priority is smaller than a correction amount of a mesh having a low priority. In addition, the priorities may be set in such a way that a mesh to be corrected has a higher priority.

The output unit 15 outputs a result of detecting the state of the penetration between the meshes. The output unit 15 outputs the result of detecting the state of the penetration between the meshes, for example, to the terminal device 30. The output unit 15 outputs, for example, a portion of the penetration between the meshes constituting the avatar, an amount of the penetration, and a timing at which penetration occurs. When no penetration occurs between the meshes, the output unit 15 may output information indicating that no penetration occurs. When the estimation unit 14 estimates correction amounts of setting values related to the meshes, the output unit 15 further outputs, for example, the correction amounts of the setting values related to the meshes.

In a case where penetration between meshes occurs at a plurality of timings, the output unit 15 may output a state of the penetration between the meshes at a timing when the amount of the penetration is largest. Furthermore, the output unit 15 may output a state of penetration between meshes based on priorities determined in terms of a timing at which penetration should not occur. The priorities determined in terms of the timing at which penetration should not occur are set, for example, in such a way that a priority is higher at a timing that is important according to the purpose of the avatar. In this case, the output unit 15 outputs, for example, a state of penetration between the meshes at a highest-priority timing among the timings at which penetration has occurred. The timing at which penetration should not occur is, for example, a timing at which a posture is likely to look unnatural when penetration has occurred according to the purpose of the avatar. For example, in an avatar that performs martial arts, for example, a posture important according to the purpose of the avatar, such as a posture at a timing of kicking moment, is set to have a higher priority than the other postures. Furthermore, the output unit 15 may output states of penetration between the meshes at a plurality of timings for a posture related to the same type of movement. For example, in a case where states of penetration related to a kicking movement are output, the output unit 15 may output states of penetration between the meshes at the beginning of the kicking, at the end of the kicking, and between the beginning of the kicking and the end of the kicking.

The output unit 15 may output an image of the avatar before being corrected and an image of the avatar after being corrected at the timing of penetration between meshes. For a movement to be corrected, the output unit 15 may output a plurality of images of the avatar different from each other in at least one of content of correction and correction amount as candidate images of the avatar after being corrected. The content of the correction includes, for example, a corrected mesh and a corrected portion. The content of the correction may be a movement in which penetration between the meshes occurs. The content of the correction is not limited to what has been described above. Furthermore, the output unit 15 may output an image in which at least one of a corrected portion in the avatar after being corrected and a movement to be corrected is emphasized.

The output unit 15 may output a plurality of images in which the avatar is moving based on selected movements. The output unit 15 outputs, for example, each image of the avatar in a case where the avatar is moved in various ways based on selected movements. For example, in a case where a kick is selected as the movement, the output unit 15 outputs images of the avatar performing various kick-related movements side by side. The various kick-related movements are, for example, a kick while jumping, a kick at a low posture, a kick with a foot raised to a high position, a kick toward the right side, a kicking toward the left side, and kicks performed consecutively. The selection of the movement is input to, for example, the terminal device 30 by an operation of the avatar creator. Then, the acquisition unit 11 acquires the selected movement from the terminal device 30. An image of the selected movement is generated by the execution unit 12 operating the movement of the avatar. Furthermore, the output unit 15 may output images in which a plurality of avatars perform the same movement side by side.

In a case where a shape of clothing to be worn on the avatar is confirmed, the output unit 15 may output each image of the avatar in which the same type of mesh is changed. The changing of the same type of mesh means, for example, changing a top, a bottom, or a hat. For example, in a case where it is confirmed whether penetration occurs depending on a shape of a shirt, the output unit 15 outputs images of the avatar for meshes corresponding to shirts having different shapes side by side. The same type of mesh is not limited to what has been described above. Furthermore, the output unit 15 may output the image of the avatar as an animation image.

In a case where the avatar is used to confirm try-on of clothing, the output unit 15 may output an image of the avatar for each piece of clothing to be tried on. For example, the output unit 15 outputs images of the avatar performing movements for the respective pieces of clothing side by side. Furthermore, the output unit 15 may output images of the avatar in which clothing has been changed for the respective movements of the avatar side by side. Furthermore, the output unit 15 outputs the correction amount of the setting value of the mesh to, for example, the avatar management system 20.

FIG. 5 is an example of a display screen that displays a detection result of an avatar in which penetration has occurred. In the example of the display screen of FIG. 5, an image of an avatar in which a partial portion of the skin of the arm is visible due to penetration between the arm portion and clothing when the avatar raises the arm is displayed on the left side. In the example of the display screen of FIG. 5, an image of an avatar in which a partial portion of the skin of the arm is visible due to penetration between the arm portion and clothing when the avatar is running is displayed on the right side. In the example of the display screen of FIG. 5, a "penetration amount" is displayed for each avatar. In the example of the display screen of FIG. 5, a side of the body where the skin is visible in the portion where the penetration occurs is indicated by an oblique line. Furthermore, in the example of the display screen of FIG. 5, the user can visually recognize that penetration occurs, for example, at a timing when the avatar raises a hand and at a timing when the avatar is running.

FIG. 5 is an example of a display screen that displays a detection result of an avatar in which penetration has occurred. In the example of the display screen of FIG. 5, an image of an avatar in which a partial portion of the skin of the arm is visible due to penetration between the arm portion and clothing when the avatar raises the arm is displayed on the left side. In the example of the display screen of FIG. 5, an image of an avatar in which a partial portion of the skin of the arm is visible due to penetration between the arm portion and clothing when the avatar is running is displayed on the right side. In the example of the display screen of FIG. 5, a "penetration amount" is displayed for each avatar. In the example of the display screen of FIG. 5, a side of the body where the skin is visible in the portion where the penetration occurs is indicated by an oblique line. Furthermore, in the example of the display screen of FIG. 5, the user can visually recognize that penetration occurs, for example, at a timing when the avatar raises a hand and at a timing when the avatar is running.

Figure 6:
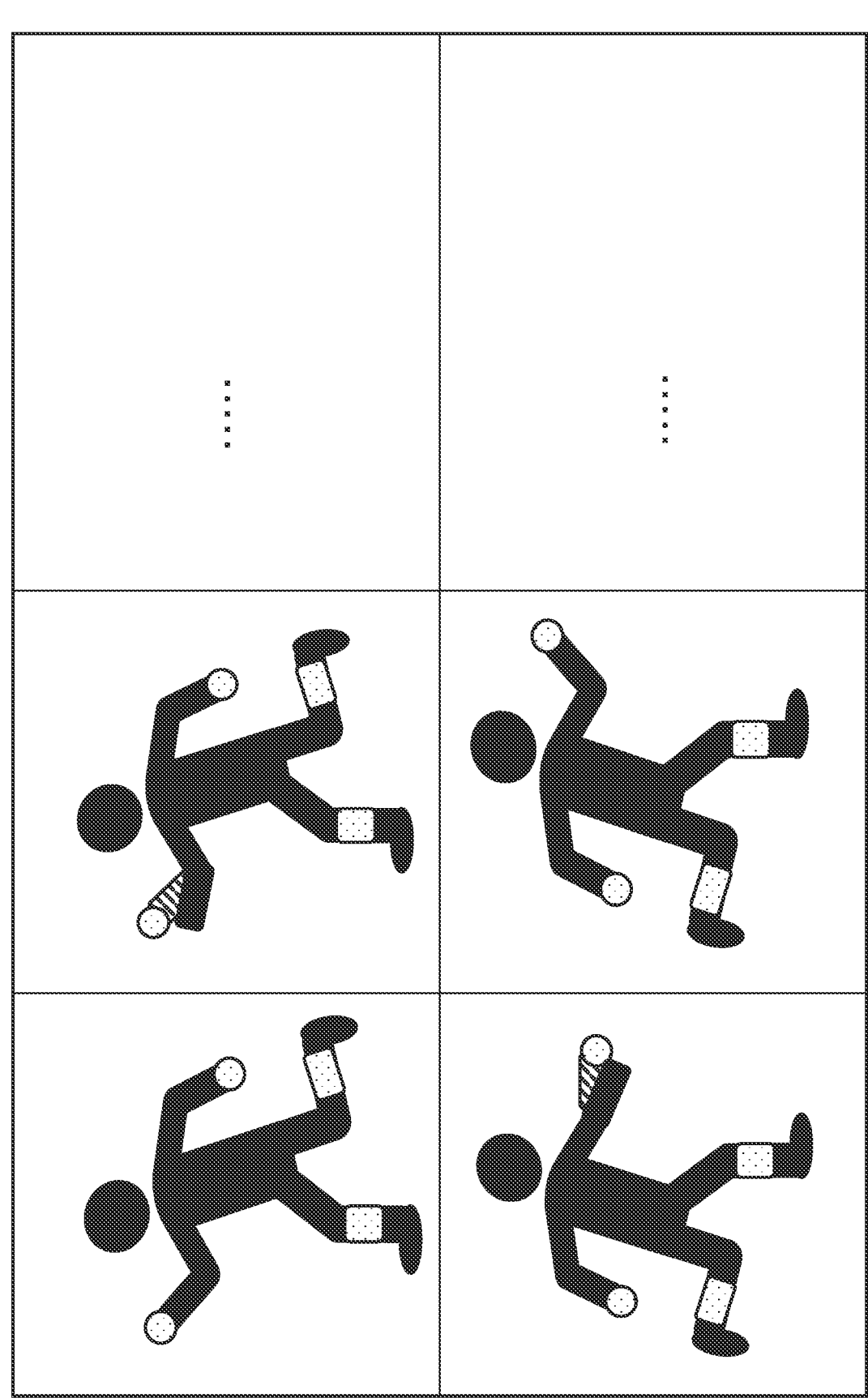
FIG. 6 is a diagram illustrating an example of a display screen according to an example embodiment of the present disclosure.

FIG. 6 is a diagram illustrating an example of a display screen that displays images of an avatar at a plurality of timings, respectively. In the example of the display screen of FIG. 6, the images of the avatar at the plurality of timings are displayed in a case where the avatar is performing running movements. Furthermore, the display screen displaying the images of the avatar at the plurality of timings, respectively, may be displayed, for example, in a case where the running movement is selected in the example of the display screen of FIG. 5.

The storage unit 16 stores, for example, data to be used for detecting penetration between meshes constituting the avatar. The storage unit 16 stores, for example, setting data for a target avatar in which penetration between meshes is to be detected. The storage unit 16 stores, for example, a predefined movement to be used at the time of operating the avatar. The storage unit 16 stores, for example, data for the avatar when operating the avatar. The storage unit 16 stores, for example, a detection model to be used for detection of penetration between meshes. The detection model may be stored in a storage means outside the avatar generation system 10. Furthermore, the storage unit 16 may store a detection result regarding penetration between meshes.

The avatar management system 20 manages, for example, setting data for an avatar that operates on a virtual space. The setting data for the avatar is, for example, setting data for bones and meshes of the avatar. The avatar management system 20 outputs the setting data for the avatar to, for example, the avatar generation system 10. Furthermore, the avatar management system 20 updates the setting data for the avatar based on, for example, correction amounts of setting values of meshes acquired from the avatar generation system 10. Furthermore, the avatar management system 20 outputs the setting data for the avatar to, for example, the virtual space management system 40.

The terminal device 30 is, for example, a terminal device used when a person who generates an avatar confirms a movement of the avatar and determines an amount of correction for the avatar. The terminal device 30 obtains an image of the movement of the avatar from, for example, the avatar generation system 10. Then, the avatar generation system 10 outputs the image of the movement of the avatar to, for example, a display device that is not illustrated.

The terminal device 30 obtains, for example, a selection of a predefined movement input by an operation of the avatar creator. The terminal device 30 then outputs the selection of the predefined movement to, for example, the avatar generation system 10. The terminal device 30 acquires, for example, a content of correction regarding the setting value for the avatar input by an operation of the avatar creator. Then, the terminal device 30 outputs the content of correction regarding the setting value for the avatar to, for example, the avatar generation system 10. The content of correction regarding the setting value for the avatar is, for example, information indicating a portion to which a correction of a setting value of a mesh is executed and a correction amount based on a detection result regarding penetration between the meshes.

As the terminal device 30, for example, a personal computer, a tablet computer, or a smartphone can be used. The terminal device 30 is not limited to what has been described above.

The virtual space management system 40 manages, for example, a virtual space. The virtual space management system 40 manages, for example, the display of the virtual space and the display of the avatar in the virtual space. For example, the virtual space management system 40 acquires, from the avatar management system 20, setting data for the avatar selected by an operation of a user using the virtual space. Then, the virtual space management system 40 outputs the avatar that operates based on the operation of the user to, for example, the virtual space.

An operation of the avatar generation system 10 will be described. FIG. 7 is a diagram illustrating an example of an operation flow of the avatar generation system 10.

The acquisition unit 11 acquires setting data for bones and meshes of avatars (step S11). The acquisition unit 11 acquires the setting data for the bones and the meshes of the avatars from, for example, the avatar management system 20 that manages the avatars.

Upon acquiring the setting data for the bones and the meshes of the avatars, the execution unit 12 executes processing of changing postures of the avatars based on the setting data for the bones and the meshes of the avatars and defined movements (step S12).

Upon executing the processing of changing the postures, the detection unit 13 detects a state of penetration between the meshes constituting each of the avatars based on data in which the posture of the avatar has been changed (step S13).

When the processing of changing the postures of the avatar have been completed for all the defined movements (No in step S14) and the processing of changing the postures have been completed for all the target avatars (No in step S15), the output unit 15 outputs a result of the detection (step S16). The output unit 15 outputs the result of detecting the state of the penetration between the meshes, for example, to the terminal device 30.

When there are movements for which the processing of changing postures of the avatar have not been completed among the defined movements in step S14 (Yes in step S14), the process returns to step S12, and the execution unit 12 executes the processing of changing a posture of the avatar based on one of the defined movements for which the processing of changing postures of the avatar have not been completed (step S12).

When there is an avatar for which the processing of changing a posture has not been completed in step S15 (Yes in step S15), the processing returns to step S12, and the execution unit 12 executes processing of changing the posture of the avatar based on the defined movement for the avatar for which the processing of changing the posture has not been completed (step S12).

The avatar generation system 10 executes processing of changing a posture of the avatar based on a defined movement. Then, the avatar generation system 10 detects a state of penetration between the meshes constituting the avatar based on data in which the posture of the avatar has been changed. For example, by changing the postures of the avatar with defined movements assumed according to the purpose of the avatar, for example, it is not necessary to individually operate the movements of the avatar to check whether penetration has occurred between meshes. Therefore, by using the avatar generation system 10, for example, it is possible to easily detect penetration between meshes that may occur when an avatar is actually used in a virtual space. Furthermore, by detecting penetration between meshes using the detection model that detects penetration between meshes from an image of the avatar, the penetration between the meshes can be more easily detected. Therefore, by using the avatar generation system 10, it is possible to easily detect penetration between meshes that may be caused by a movement of the avatar.

Furthermore, by using the avatar generation system 10, it is possible to obtain an avatar in which an occurrence of penetration between meshes is suppressed by detecting a portion of penetrate between meshes, an amount of the penetration, and a timing at which penetration occurs, and correcting setting values of the meshes not to cause penetration. By suppressing an occurrence of penetration between meshes, it is possible to obtain an avatar that looks natural, for example, even when the avatar performs various movements according to an assumed purpose.

Furthermore, by outputting states of penetration between meshes at a plurality of timings for a posture related to the same type of movement, for example, it is possible to appropriately make a decision in correcting setting values of the meshes. Furthermore, by suppressing an occurrence of penetration between meshes using the avatar generation system 10, it is possible to generate an optimized avatar, for example, according to an assumed purpose of the avatar.

The processes of the virtual space system may be executed in the same information processing device. Furthermore, among the processes of the avatar generation system 10, the avatar management system 20, the terminal device 30, and the virtual space management system 40, processes of a plurality of systems may be executed in the same information processing device. For example, the processes of the avatar generation system 10, the avatar management system 20, and the terminal device 30 may be executed in the same information processing device. Furthermore, the processes of the avatar generation system 10 and the terminal device 30 may be executed in the same information processing device. How the processes of the virtual space system are performed in a distributed manner by a plurality of information processing devices can be appropriately set. The processes of the avatar generation system 10 may be executed in a distributed manner in a plurality of information processing devices connected to each other via a network. For example, the processes of the execution unit 12 and the processes of the detection unit 13 and the estimation unit 14 may be performed in different information processing devices. Which one of the plurality of information processing devices performs each process of the avatar generation system 10 can be appropriately set.

Figure 8:
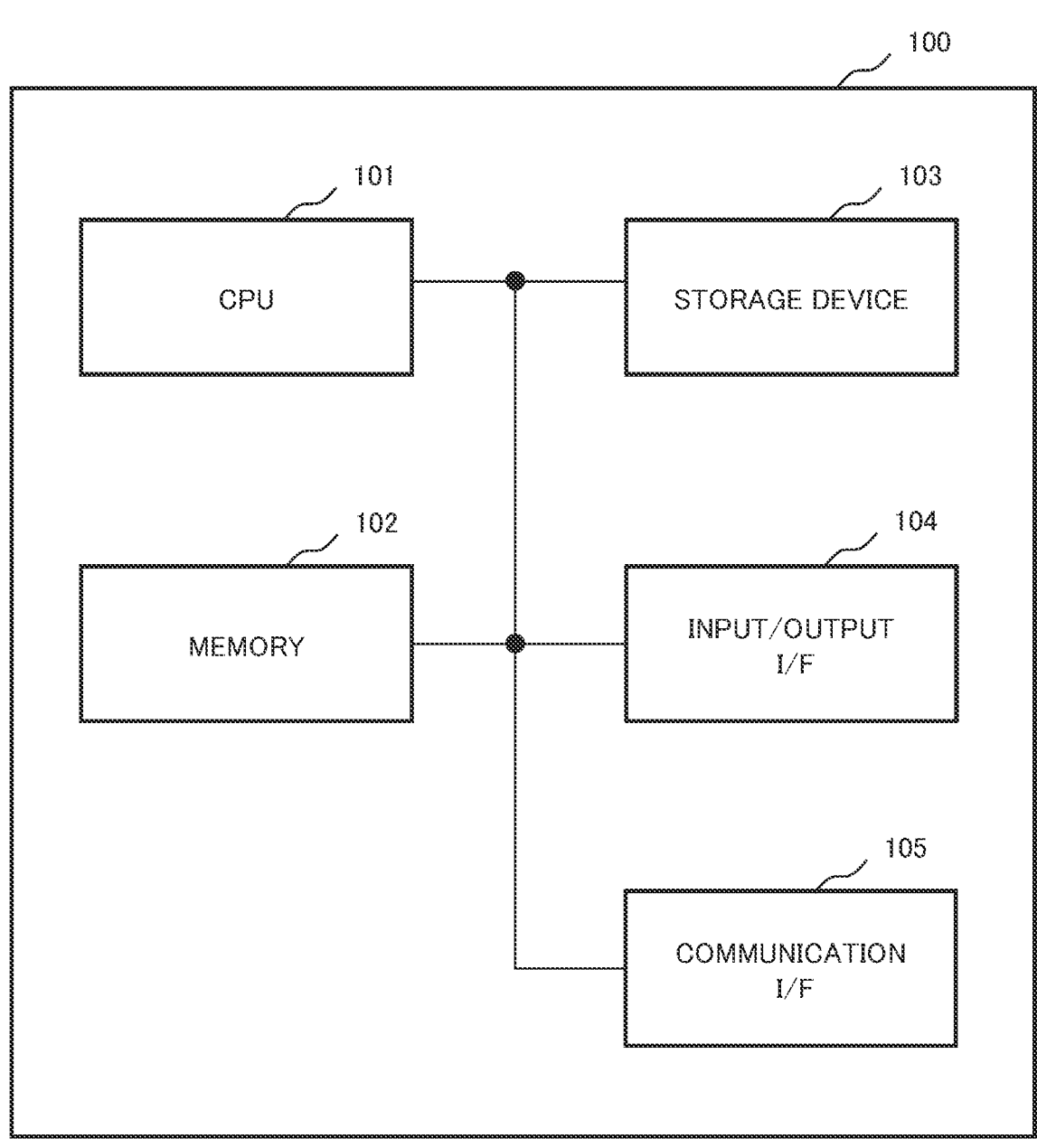
FIG. 8 is a diagram illustrating an example of a hardware configuration of an avatar generation system according to an example embodiment of the present disclosure.

Each process of the avatar generation system 10 can be realized by executing a computer program on a computer. FIG. 8 illustrates an example of a configuration of a computer 100 that executes a computer program for performing each process of the avatar generation system 10. The computer 100 includes, for example, a central processing unit (CPU) 101, a memory 102, a storage device 103, an input/output interface (I/F) 104, and a communication I/F 105.

The CPU 101 reads a computer program for performing each process from the storage device 103, and executes the computer program. The CPU 101 may be configured by a combination of a plurality of CPUs. In addition, the CPU 101 may be configured by a combination of a CPU and another type of processor. For example, the CPU 101 may be configured by a combination of a CPU and a graphics processing unit (GPU). The memory 102 is constituted by a dynamic random access memory (DRAM) or the like, and temporarily stores a computer program to be executed by the CPU 101 and data that is being processed. The storage device 103 stores a computer program to be executed by the CPU 101. The storage device 103 is constituted by, for example, a nonvolatile semiconductor storage device. As the storage device 103, another storage device such as a hard disk drive may be used. The input/output I/F 104 is, for example, an interface that receives an input from a person who operates the computer 100 and outputs display data and the like. The communication I/F 105 is an interface that transmits and receives data to and from another information processing device. Furthermore, the avatar management system 20, the terminal device 30, and the virtual space management system 40 may also have configurations similar to those of the computer 100.

The computer program used for executing each process can also be distributed after being stored in a computer-readable recording medium that non-transitorily records data. As the recording medium, for example, a magnetic tape for recording data or a magnetic disk such as a hard disk can be used. As the recording medium, an optical disk such as a compact disc read only memory (CD-ROM) can also be used. A non-volatile semiconductor storage device may be used as the recording medium.

Interaction using a virtual space is performed in various fields. A user of a virtual space interacts with other users via an avatar. The virtual space in which the user participates by operating the avatar present in the virtual space is also referred to as a meta-verse space.

The avatar includes, for example, bones and meshes. The bones are skeletal portions that give a change in shape of the avatar. Furthermore, each of the meshes is used, for example, to express a shape of each portion of the avatar. The shapes of the meshes are expressed by a polygon obtained by connecting vertices in the respective meshes. Each of the vertices of the meshes is weighted and associated with a bone.

An avatar creator generates the avatar by, for example, combining a bone and a mesh for each piece of clothing or the like worn by the avatar with the avatar's body. That is, when generating one avatar, for example, a skin mesh and a clothing mesh are combined. However, when the skin mesh and the clothing mesh are misaligned, the avatar becomes unnatural. Such a misalignment between the meshes is also referred to as penetration between the meshes. The penetration between the meshes is corrected, for example, by the avatar creator.

The related art described in the background art causes a problem, such as it is difficult to detect penetration between meshes that can be caused by a movement of an avatar. An example advantage according to the present disclosure is that penetration between meshes that is caused by a movement of an avatar can be detected easily.

Some or all of the above-described example embodiments may be described as in the following supplementary notes, but are not limited to the following supplementary notes.

Supplementary Note 1

An avatar generation system including:
at least one memory storing instructions; and
at least one processor configured to access the at least one memory and execute the instructions to:
acquire setting data for bones and meshes of an avatar;
execute processing of changing a posture of the avatar based on the setting data and a defined movement;
detect a state of penetration between the meshes constituting the avatar based on data in which the posture of the avatar has been changed; and
output a result of the detection.

Supplementary Note 2

The avatar generation system according to supplementary note 1, in which
the at least one processor is further configured to execute the instructions to:
detect the state of penetration between the meshes constituting the avatar, based on the data in which the posture of the avatar has been changed according to a defined movement, using a detection model that detects penetration between the meshes constituting the avatar based on the data in which the posture of the avatar has been changed.

Supplementary Note 3

The avatar generation system according to supplementary note 1 or 2, wherein
the at least one processor is further configured to execute the instructions to:
estimate correction amounts of setting values of the meshes based on the result of the detection; and
output the correction amounts.

Supplementary Note 4

The avatar generation system according to supplementary note 3, wherein the at least one processor is further configured to execute the instructions to:
output an image of the avatar before being corrected and an image of the avatar after being corrected at a timing of the penetration between the meshes.

Supplementary Note 5

The avatar generation system according to supplementary note 3, wherein
the at least one processor is further configured to execute the instructions to:
output a plurality of images of the avatar different from each other in at least one of content of correction and correction amount, for a movement to be corrected, as candidate images of the avatar after being corrected.

Supplementary Note 6

The avatar generation system according to supplementary note 3, wherein
the at least one processor is further configured to execute the instructions to:
output an image in which at least one of a corrected portion in the avatar after being corrected and a movement to be corrected is emphasized.

Supplementary Note 7

The avatar generation system according to supplementary note 1, wherein
the at least one processor is further configured to execute the instructions to:
output a plurality of images in which the avatar is moving based on selected movements.

Supplementary Note 8

The avatar generation system according to supplementary note 1, wherein
the at least one processor is further configured to execute the instructions to:
output each image of the avatar in which the same type of mesh is changed.

Supplementary Note 9

The avatar generation system according to supplementary note 3, wherein
the at least one processor is further configured to execute the instructions to:
estimate a correction amount of a setting value of each of a plurality of meshes based on priorities set for at least some of the plurality of meshes.

Supplementary Note 10

The avatar generation system according to supplementary note 3, wherein
the at least one processor is further configured to execute the instructions to:
estimate a correction amount of a setting value of each of a plurality of meshes based on a weight value set for each of the plurality of meshes.

Supplementary Note 11

The avatar generation system according to supplementary note 1, wherein the state of penetration is at least one of a portion of the penetration between the meshes, an amount of the penetration, and a timing at which the penetration occurs.

Supplementary Note 12

The avatar generation system according to supplementary note 2, wherein
the at least one processor is further configured to execute the instructions to:
detects the state of penetration between meshes constituting the avatar from an image showing the avatar of which the posture has been changed.

Supplementary Note 13

The avatar generation system according to supplementary note 3, wherein
the setting value of each of the meshes is at least one of a shape of the mesh, a position of a vertex of the mesh, and a setting value of a weight of the mesh.

Supplementary Note 14

An avatar generation method including:
acquiring setting data for bones and meshes of an avatar;
executing processing of changing a posture of the avatar based on the setting data and a defined movement;
detecting a state of penetration between the meshes constituting the avatar based on data in which the posture of the avatar has been changed; and
outputting a result of the detection.

Supplementary Note 15

An avatar generation program for causing a computer to execute:
acquiring setting data for bones and meshes of an avatar;
executing processing of changing a posture of the avatar based on the setting data and a defined movement;
detecting a state of penetration between the meshes constituting the avatar based on data in which the posture of the avatar has been changed; and
outputting a result of the detection.
In addition, some or all of the configurations described in supplementary notes 2 to 13, which depend on supplementary note 1 described above, can also depend on supplementary notes 14 and 15 with the same dependency relationship as supplementary notes 2 to 13. Furthermore, some or all of the configurations described as the supplementary notes can similarly depend on, not limited to supplementary notes 1, 14, and 15, various recording means or systems for recording various pieces of hardware and software, without departing from the above-described example embodiments.

The previous description of embodiments is provided to enable a person skilled in the art to make and use the present disclosure. Moreover, various modifications to these example embodiments will be readily apparent to those skilled in the art, and the generic principles and specific examples defined herein may be applied to other embodiments without the use of inventive faculty. Therefore, the present disclosure is not intended to be limited to the example embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. An avatar generation system comprising:
at least one memory storing instructions;
at least one processor configured to access the at least one memory and execute the instructions to:
acquire setting data for bones and meshes of an avatar;
execute processing of changing a posture of the avatar based on the setting data and a defined movement;
detect a state of penetration between the meshes constituting the avatar based on data in which the posture of the avatar has been changed;
estimate correction amounts of setting values of the meshes based on the result of the detection; and
output a plurality of images of the avatar different from each other in at least one of content of correction and correction amount, for a movement to be corrected, as candidate images of the avatar after being corrected.

2. The avatar generation system according to claim 1, wherein
the at least one processor is further configured to execute the instructions to:
detect the state of penetration between the meshes constituting the avatar, based on the data in which the posture of the avatar has been changed according to a defined movement, using a detection model that detects penetration between the meshes constituting the avatar based on the data in which the posture of the avatar has been changed.

3. The avatar generation system according to claim 2, wherein
the detection model is a machine learning model that detects the state of penetration between meshes constituting the avatar from an image showing the avatar of which the posture has been changed.

4. The avatar generation system according to claim 1, wherein
the at least one processor is further configured to execute the instructions to:
output a result of the detection and the correction amounts.

5. The avatar generation system according to claim 4, wherein
the at least one processor is further configured to execute the instructions to:
output an image of the avatar before being corrected and an image of the avatar after being corrected at a timing of the penetration between the meshes.

6. The avatar generation system according to claim 1, wherein
the at least one processor is further configured to execute the instructions to:
output an image in which at least one of a corrected portion in the avatar after being corrected and a movement to be corrected is emphasized.

7. The avatar generation system according to claim 1, wherein
the at least one processor is further configured to execute the instructions to:
output a plurality of images in which the avatar is moving based on selected movements.

8. The avatar generation system according to claim 1, wherein
the at least one processor is further configured to execute the instructions to:

output each image of the avatar in which the same type of mesh is changed.

9. The avatar generation system according to claim 1, wherein
the at least one processor is further configured to execute the instructions to:
estimate a correction amount of a setting value of each of a plurality of meshes based on priorities set for at least some of the plurality of meshes.

10. The avatar generation system according to claim 1, wherein
the at least one processor is further configured to execute the instructions to:
estimate a correction amount of a setting value of each of a plurality of meshes based on a weight value set for each of the plurality of meshes.

11. The avatar generation system according to claim 1, wherein
the state of penetration is at least one of a portion of the penetration between the meshes, an amount of the penetration, and a timing at which the penetration occurs.

12. The avatar generation system according to claim 1, wherein
the setting value of each of the meshes is at least one of a shape of the mesh, a position of a vertex of the mesh, and a setting value of a weight of the mesh.

13. An avatar generation method comprising:
acquiring setting data for bones and meshes of an avatar;
executing processing of changing a posture of the avatar based on the setting data and a defined movement;
detecting a state of penetration between the meshes constituting the avatar based on data in which the posture of the avatar has been changed;
estimating correction amounts of setting values of the meshes based on the result of the detection; and
outputting a plurality of images of the avatar different from each other in at least one of content of correction and correction amount, for a movement to be corrected, as candidate images of the avatar after being corrected.

14. The avatar generation method according to claim 13, wherein
the state of penetration between the meshes constituting the avatar is detected based on the data in which the posture of the avatar has been changed according to a defined movement, using a detection model that detects penetration between the meshes constituting the avatar based on the data in which the posture of the avatar has been changed.

15. The avatar generation method according to claim 13, further comprising:
outputting a result of the detection and the correction amounts.

16. The avatar generation method according to claim 15, wherein
an image of the avatar before being corrected and an image of the avatar after being corrected are output at a timing of the penetration between the meshes.

17. The avatar generation method according to claim 15, wherein
an image in which at least one of a corrected portion in the avatar after being corrected and a movement to be corrected is emphasized is output.

18. A non-transitory recording medium that stores avatar generation program for causing a computer to execute:
acquiring setting data for bones and meshes of an avatar;

US 12,675,934 B2

21 executing processing of changing a posture of the avatar
based on the setting data and a defined movement;
detecting a state of penetration between the meshes con-
stituting the avatar based on data in which the posture
of the avatar has been changed;
estimating correction amounts of setting values of the
meshes based on the result of the detection; and
outputting a plurality of images of the avatar different
from each other in at least one of content of correction
and correction amount, for a movement to be corrected,
as candidate images of the avatar after being corrected.

* * * * *